US007653555B2

(12) United States Patent
Wiese

(10) Patent No.: US 7,653,555 B2
(45) Date of Patent: Jan. 26, 2010

(54) VALUATION USING CREDIT SCORE

(76) Inventor: Steven Paul Wiese, 35914 Chartercrest, Farmington, MI (US) 48335

( * ) Notice: Subject to any disclaimer, the term of this patent is extended or adjusted under 35 U.S.C. 154(b) by 0 days.

(21) Appl. No.: 12/106,756

(22) Filed: Apr. 21, 2008

(65) Prior Publication Data
US 2009/0265181 A1 Oct. 22, 2009

(51) Int. Cl.
*G06Q 10/00* (2006.01)
(52) U.S. Cl. .......................................................... 705/1
(58) Field of Classification Search ...................... 705/1
See application file for complete search history.

(56) References Cited

U.S. PATENT DOCUMENTS

| 5,414,621 | A | * | 5/1995 | Hough | 705/10 |
|---|---|---|---|---|---|
| 5,857,174 | A | | 1/1999 | Dugan | |
| 7,289,965 | B1 | * | 10/2007 | Bradley et al. | 705/1 |
| 2002/0032585 | A1 | * | 3/2002 | Keyes | 705/4 |
| 2003/0110112 | A1 | * | 6/2003 | Johnson et al. | 705/36 |
| 2006/0085207 | A1 | | 4/2006 | Carey et al. | |
| 2008/0004893 | A1 | | 1/2008 | Graboske | |

OTHER PUBLICATIONS

Property Listings from MRIS, 2007-2008, Metropolitan Regional Informatin Systems, Inc.*
S&P Revises Method To Assess House Price Volatility, Apr. 1, 2002, PR Newswire.*
Abi, "Valuation of Texas LIHTC Apartments Restricted by Land Use Restriction Agreements," Appraisal Journal v73n1, pp. 47-55, Winter 2005.
Banton, Stan H., "The growing debate over appraisal technology," Mortgage Banking, 63,1, 123 (4) Oct. 2002.
The Gale Group, "Business & Industry," Jul. 1994-Apr. 4, 2008.
The Gale Group, "Falling Mortgage Dominos: Like its subprime sibling, the Alt-A Mortgage mart sees rise in late payments and defaults," Jan. 1, 2008.
Hershkowitz, Brian, "A New Vision for Valuation: What if there was a simple FICO-like score for property valuations?" Mortgage Banking, 65, 1, 138(6), Oct. 2004.
Pulliam Weston, Liz, "Insurers Keep a Secret History of Your Home," www.articles.moneycentral.msn.com.Insurance/InsureYourHome/Insure..., Feb. 1, 2008.
Decker, Bobbi, "Property Insurance".
Gale Group & Trade Industry DB, "Refining Valuation Models: property-valuation models have a ways to go before their full contribution to the lending process can be realized," Aug. 2005.
Nattagh et al., "Refining Valuation Models: property-valuation models have a ways to go before their full contribution to the lending process can be realized," Aug. 2005.

* cited by examiner

*Primary Examiner*—Naresh Vig
(74) *Attorney, Agent, or Firm*—Carlson, Gaskey & Olds, P.C.

(57) ABSTRACT

A method of appraising the value of a property based on obtaining a credit score of an owner of a property and assigning an ownership responsibility indicator to the property. The ownership responsibility indicator provides insight into the condition of the property without performing a complete inspection. A more accurate value of the property can then be determined.

7 Claims, 5 Drawing Sheets

|  | Subject | Comp. 1 | Comp. 2 | Comp. 3 | Comp. 4 | Comp. 5 |
|---|---|---|---|---|---|---|
| Style | Ranch | Ranch | Ranch | Ranch | Ranch | Ranch |
| Square Ft. | 1000 | 1000 | 1000 | 1000 | 1000 | 1000 |
| Age (yr) | 10 | 10 | 10 | 10 | 10 | 10 |
| ORI | High | Low | Medium | High | High | High |
| Sale Price ($) | ? | 90,000 | 100,000 | 110,000 | 110,000 | 110,000 |
| Lot Size | Average | Average | Average | Average | Average | Average |
| Location | Sub. | Sub. | Sub. | Sub. | Sub. | Sub. |

Subject Property Value: $110,000

Fig-5

VALUATION USING CREDIT SCORE

BACKGROUND OF THE INVENTION

The present invention relates generally to computer systems and more particularly a computer system for determining a value of a property.

Valuation products such as automated valuation models (AVM), drive by appraisals, desk reviews, and others that do not include an inspection have a significant short fall. They have no way of determining a condition of the property. This is less of a problem with new structures, however, as a structure ages, its condition is often the most important factor when comparing it to other similar structures. Unless a complete inspection is performed, lenders, insurance companies, or others concerned with the value of the property are unable to determine its condition.

SUMMARY OF THE INVENTION

The present invention provides a method and computer system for obtaining information regarding a condition of a property and assigning a value to the property without performing a complete inspection.

Preferably, the computer system of the present invention includes a database for accessing information to determine a value range or a specific value within a range for the property and to obtain a credit score for an owner of the property. From the owner's credit score, an ownership responsibility indicator is determined for the property. The ownership responsibility indicator provides insight into the condition of the property. The condition determined by the ownership responsibility indicator generates a more accurate value or range of values to be assigned to the property.

Another example method includes a computer system obtaining a credit score for an owner of a property and at least one previous owner of the property from a database. From the credit scores of the current owner and the at least one previous owner, an ownership responsibility indicator is determined for the property. The condition determined by the ownership responsibility indicator based on the credit scores of the current owner and previous owner generates a more accurate value or range of values to be assigned to the property by the computer.

Another example method includes a computer system obtaining a credit score of an owner of a property from a database and defining an ownership responsibility indicator for the property. The computer system also obtains a credit score for each owner of a plurality of comparable property sold and defines an ownership responsibility indicator for the comparable property based on the credit score of its owner. A value is assigned to the property based on matching the ownership responsibility indicator of the plurality of comparable properties sold with the ownership responsibility indicator of the property and assigning the value of the comparable property sold to the property whose value is being determined.

BRIEF DESCRIPTION OF THE DRAWINGS

The above, as well as other advantages of the present invention, will become readily apparent to those skilled in the art from the following detailed description of a preferred embodiment when considered in light of the accompanying drawings in which:

FIG. 5 shows an example of the method of FIG. 4.

DETAILED DESCRIPTION OF THE PREFERRED EMBODIMENT

Figure 1:
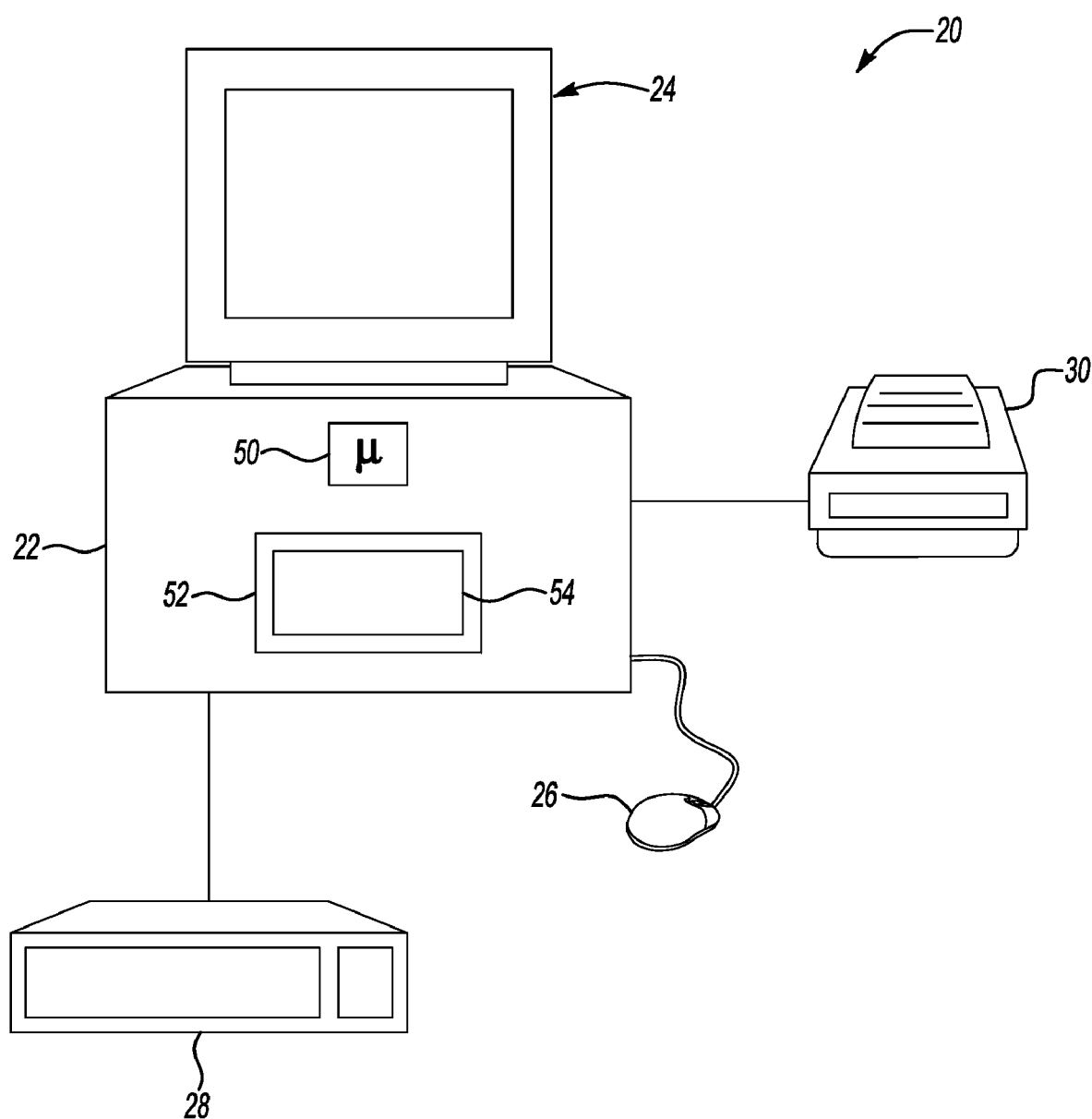
FIG. 1 is a schematic of a computer system of the present invention.

The present invention provides a computer system 20, as shown in FIG. 1, for determining a value of a property according to a method of the present invention. The computer system 20 includes a CPU 22 for creating an ownership responsibility indicator for the property and assigning a condition and/or value to the property in a manner which will be discussed below. The CPU 22 includes a display 24 and input devices, such as a mouse 26 and/or a keyboard 28. The CPU 22 is also connected to a printer 30.

The CPU 22 includes a microprocessor 50 accessing computer memory 52, such as a hard drive, RAM, CD ROM, ROM, etc. The computer memory 52 stores a database 54. The database 54 may include the following information: current and previous property owners' credit score, a valuation method, and property data, such as geographic region, lot size, style of structure, age of structure, date of sale, and living space. If the information is not stored on the database 54, it may be manually entered by a user.

The microprocessor 50 of the CPU 22 is preprogrammed with suitable software to perform the functions described herein.

Figure 2:
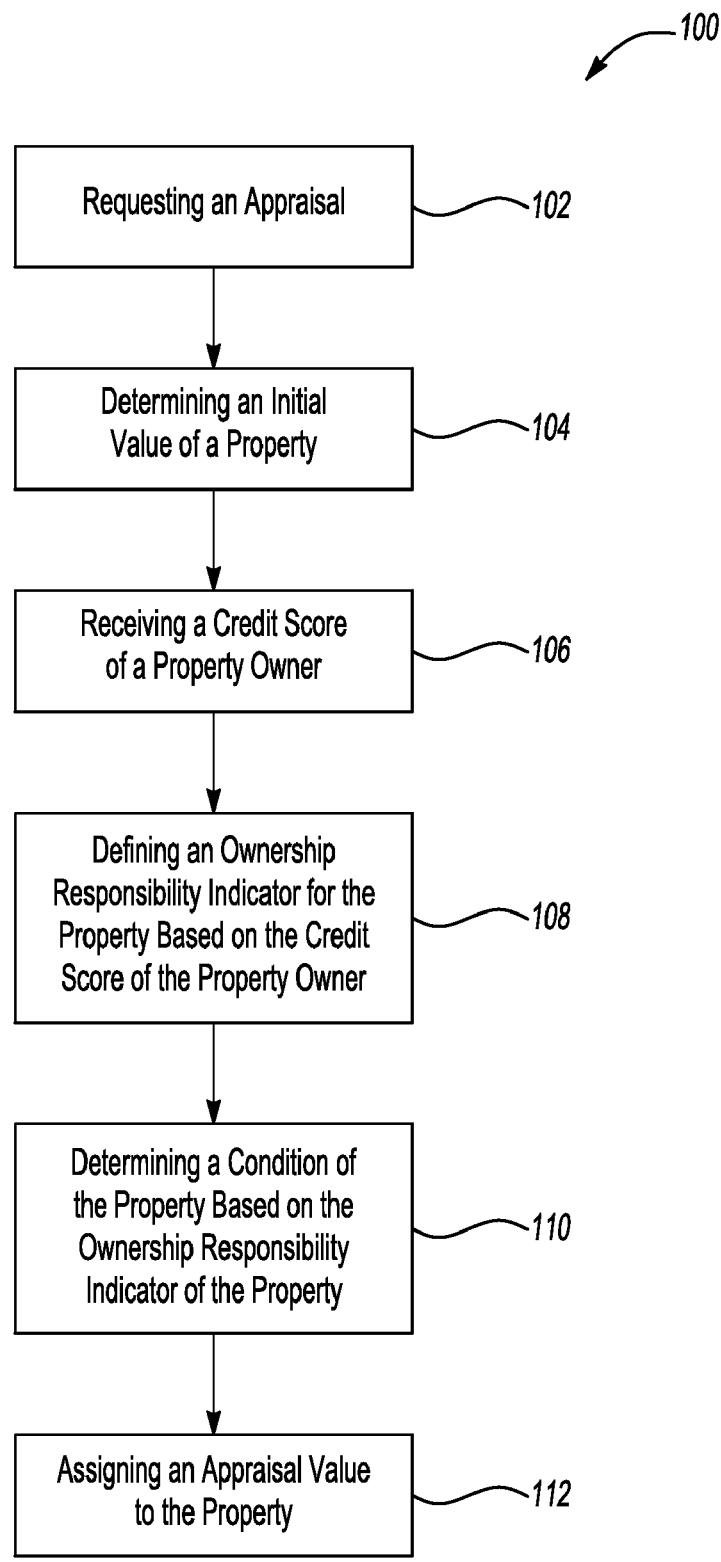
FIG. 2 shows the flow of an example method for appraising a value of a property.

An example method 100 for determining a value of a property is shown in FIG. 2. The method 100 includes requesting an appraisal for the property (step 102). The request may originate from a mortgage lender, an insurance company, a borrower, or another concerned with the value and or condition of the property.

An initial value for the property is determined (step 104) by the CPU 22 accessing the valuation method from the database 54. The valuation method may include an automated valuation model (AVM), a drive by appraisal, a desk review, or another similar method that does not include a complete inspection to determine the initial value of the property. The initial value may include a range of values, a single value, or a single value within a range of values.

The CPU 22 accesses the database 54 to determine a credit score of the owner of the property (step 106). The credit score is preferably a FICO score, a Vantage score, or another score commonly known in the industry.

An ownership responsibility indicator (ORI) for the property is created by the CPU 22 based on the credit score of the owner of the property (step 108). The ORI is divided into at least two ranges based on the credit score of the owner of the property. For example, when using a FICO credit score, a score of 600-850 corresponds to a high ORI, and a score of 300-599 corresponds to a low ORI. Although a preferred range is given, one of ordinary skill in the art would recognize that further divisions in the scale could be made to increase its accuracy. Also, adjustments to the score ranges may be necessary to account for varying geographic regions.

Furthermore, a significant drop in the owner's credit score will signify a low ORI for the property. Similarly, a consistently high credit score will signify a high ORI for the property.

The CPU 22 correlates the ORI for the property as described above with a condition of the property (step 110). A high ORI for the property indicates the property is being maintained an average to a good condition. A low ORI for the property indicates the property is being maintained at an average to a poor condition.

An appraisal value is assigned to the property by the CPU 22 based on the ORI (step 112) and/or the condition determined by the ORI. The appraisal value is presented on the display 24 or printed on paper by the printer 30. The high ORI corresponds to the appraisal value being at a high end of the initial value range or being at a narrower range of values at the high end of the initial value range. The low ORI corresponds to the appraisal value being at the low end of the initial value range or being at a narrower range of values at the low end of the initial value range.

Figure 3:
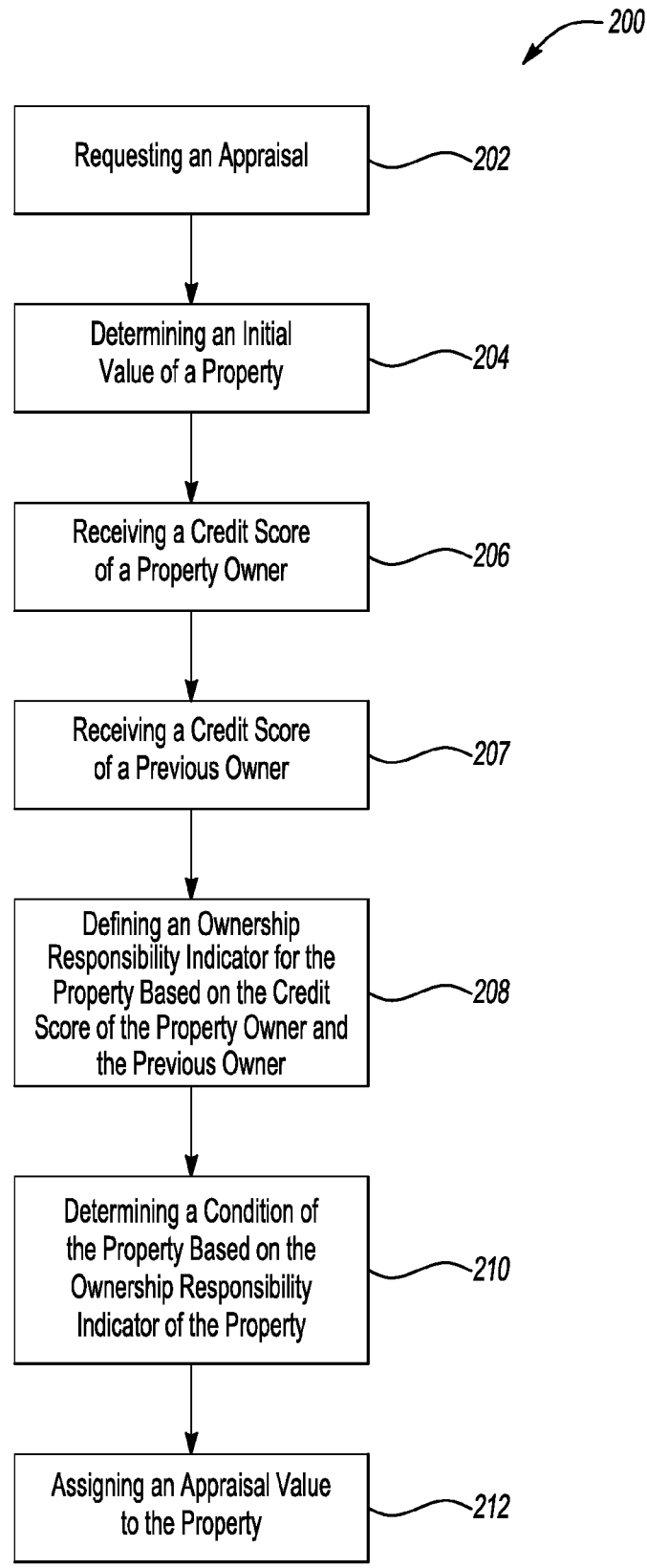
FIG. 3 shows the flow of another example method for appraising a value of a property.

As shown in FIG. 3, an example method 200 for determining a value of a property is generally the same as the method 100 described above except as otherwise described below or shown in FIG. 2. The CPU 22 obtains a credit score of at least one previous owner of the property (step 207) from the database 54. The CPU 22 determines an ownership responsibility indicator for the property based on the credit score of the owner of the property and the credit score of the at least one previous owner of the property (step 208).

Figure 4:
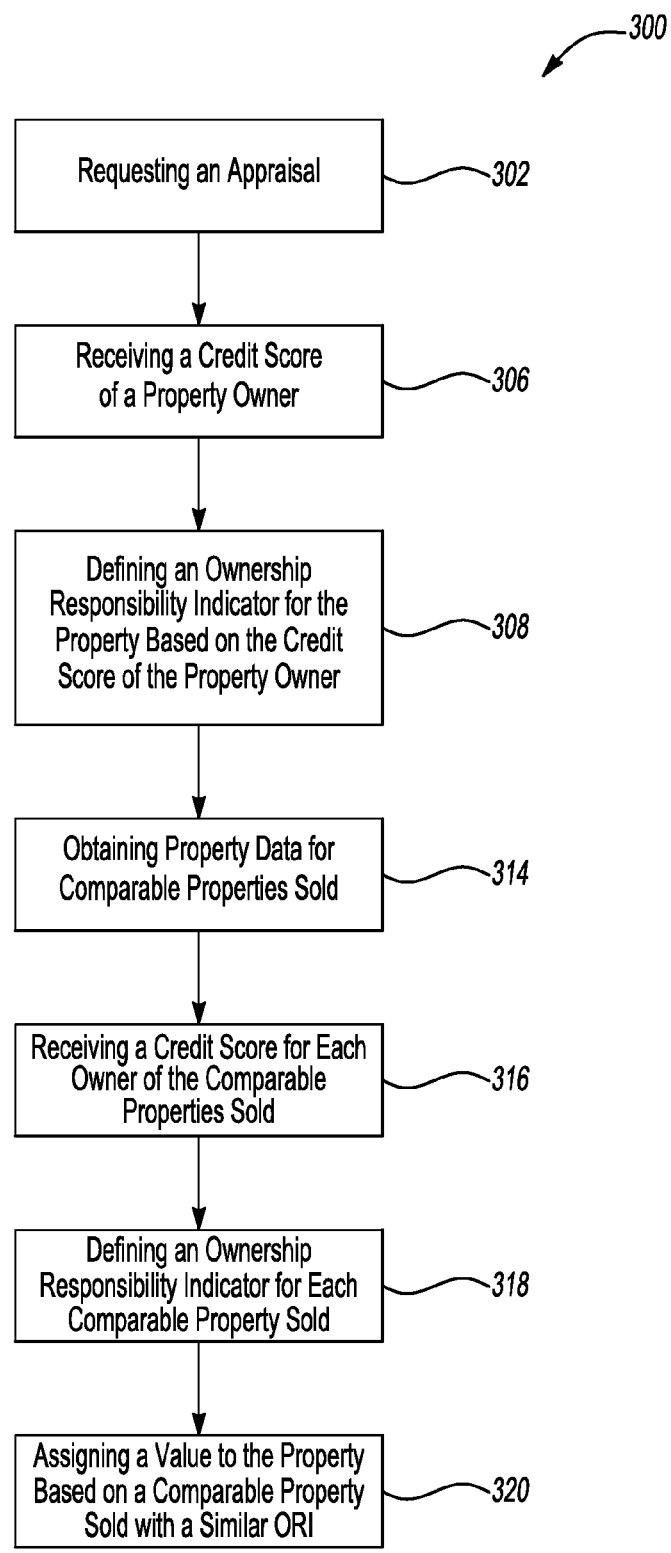
FIG. 4 shows the flow of another example method for appraising a value of a property.

As shown in FIG. 4, an example method 300 for determining a value of a property is generally the same as the method 100 described above except as otherwise described below or shown in FIG. 5. The CPU 22 obtains property data for a plurality of comparable properties sold (step 314) from the database 54. The property data includes at least two of the following: geographic region, lot size, style of structure, age of structure, date of sale, and living space. The CPU 22 obtains a credit score for each owner of the plurality of comparable properties sold (step 316) from the database 54.

The CPU 22 assigns an ORI to the plurality of comparable properties sold based on the credit score of each owner of the comparable property (step 318). The CPU 22 then assigns an appraisal value to the property based on matching the ORI of the property with the ORI of the comparable property sold and assigning the value of the comparable property sold with a matching ORI as the appraisal value of the property.

FIG. 5 is an example of the method 300 described above. The CPU 22 creates a chart 330. A plurality of property data categories 332 are displayed on the chart 330 on a vertical axis 334. A subject appraisal property 338 and a plurality of comparable properties sold 340 are shown on a horizontal axis 336 of the chart 330. By matching an ORI of the subject property with an ORI of the comparable properties sold 340 from the chart 330, the CPU 22 determines the value of the subject property 338. As shown on the chart 330, the subject property value 342 would be $110,000 for this example.

Investment banks package a mortgage backed security (MBS) to sell to investors. A rating is assigned to the MBS by agencies such as the Standard and Poors or Fitch. One of the most important factors in assigning the rating to the MBS is an analysis of the collateral. Currently, the analysis is performed with an AVM. Current AVMs consider a plurality of comparable properties sold and discard comparable properties sold with values substantially higher or lower than a median or mode value of the plurality of comparable properties sold. However, by considering the ORI of the plurality of comparable properties sold in connection with the AVM, the determined value of the property will be more indicative of the value of the property, even though the determined value may be substantially higher or lower than the median or mode value of the plurality of comparable properties sold.

Considering the ORI of the property owner is helpful in analyzing collateral in a transitional neighborhood where the property is being renovated or updated. With many properties foreclosed, abandoned, or dilapidated, the median or mode value of the plurality of comparable properties sold may be low. However, current AVMs may consider the plurality of comparable properties sold that were either renovated or updated as an anomaly and an irrelevant comparable property. By comparing the ORI of the plurality of comparable properties sold with the ORI of the subject property, a more accurate value may be assigned to the subject property that may be either substantially higher or lower than the median or mode of the plurality of comparable properties sold.

Considering the ORI of the property owner is also useful in analyzing collateral in previously stable urban areas with historically few foreclosures. For example, a loan on a property where the ORI indicates likely foreclosure will not be assigned a value similar to a typical arms length transaction with standard marketing times and conditions. In this case, the property will be assigned a value closer to other foreclosed properties in the area.

As the property used for collateral for the MBS changes ownership, the ORI of the new owner may be used to determine the value of the property as well as determine any change in the value of the collateral. Moreover, this could reduce the effect of redlining because the appraisal of the home will be compared to homes with owners with similar credit scores, which might mean a comparison with homes that are farther away, and less comparison with some nearby homes with different credit scores.

Although a preferred embodiment has been disclosed, a worker of ordinary skill in this art would recognize that certain modifications would come within the scope of this invention. For that reason, the following claims should be studied to determine the true scope and content of this invention.

What is claimed is:

1. A computer-implemented method of determining an appraised value of a property including the steps of:
    a) receiving a request for an appraisal of the property;
    b) determining an initial value of the property;
    c) retrieving with a computer a credit score of an owner of a property from a computer database;
    d) defining an ownership responsibility indicator for the property based on the credit score of the owner of the property;
    e) obtaining property data for a plurality of comparable properties sold;
    f) retrieving a credit score for each owner of the plurality of comparable properties sold;
    g) defining an ownership responsibility indicator for the plurality of comparable properties sold based on the credit score of each owner of the plurality of comparable properties sold; and
    h) calculating in the computer a—the appraised value of the property based on a value of the plurality of comparable properties sold having a similar ownership responsibility indicator.

2. The method of claim 1 wherein said steps e), and f) and g) are performed before step c).

3. The method as recited in claim 1, wherein the plurality of comparable properties sold are determined by at least two of the following: geographic region, lot size, style of structure, age of structure, date of sale, and living space.

4. A computer-implemented method of determining an appraised value of a property including the steps of:
    a) receiving a request for an appraisal of the property;
    b) determining an initial value of the property;
    c) retrieving in a computer a credit score of an owner of a property from a computer database;

d) defining an ownership responsibility indicator for the property based on the credit score of the owner of the property; and e) calculating in the computer an appraised value of the property based on the initial value and based upon the ownership responsibility indicator.

5. The method of claim 4 wherein the initial value includes a value of a comparable property where the credit score of an owner of the comparable property is similar to the credit score of the property.

6. The method of claim 5 wherein the value of the comparable property is based upon a sale of the comparable property.

7. The method as recited in claim 5, wherein the comparable property is determined to be comparable based upon at least two of the following: geographic region, lot size, style of structure, age of structure, date of sale, and living space.

\* \* \* \* \*

UNITED STATES PATENT AND TRADEMARK OFFICE
CERTIFICATE OF CORRECTION

PATENT NO. : 7,653,555 B2
APPLICATION NO. : 12/106756
DATED : January 26, 2010
INVENTOR(S) : Steven Paul Wiese It is certified that error appears in the above-identified patent and that said Letters Patent is hereby corrected as shown below:

IN THE CLAIMS:

Claim 1, Column 4, line 52: delete "a—"

Signed and Sealed this

Twenty-fifth Day of May, 2010

David J. Kappos
*Director of the United States Patent and Trademark Office*